(12) United States Patent
Oh (10) Patent No.: US 9,476,511 B2
(45) Date of Patent: Oct. 25, 2016

(54) VALVE DEVICE CAPABLE OF WASHING INTERNAL PIPE IN HOT WATER BOILER

(71) Applicant: Kofulso Co., Ltd., Incheon-si (KR)

(72) Inventor: Seung-il Oh, Seoul (KR)

(73) Assignee: KOFULSO CO., LTD., Incheon-Si (KR)

( * ) Notice: Subject to any disclaimer, the term of this patent is extended or adjusted under 35 U.S.C. 154(b) by 365 days.

(21) Appl. No.: 14/174,293

(22) Filed: Feb. 6, 2014

(65) Prior Publication Data

US 2015/0219412 A1  Aug. 6, 2015

(51) Int. Cl.
| | |
|---|---|
| *F16K 11/065* | (2006.01) |
| *F28G 9/00* | (2006.01) |
| *F28G 15/00* | (2006.01) |
| *F24H 9/12* | (2006.01) |

(52) U.S. Cl.
CPC .......... *F16K 11/0655* (2013.01); *F24H 9/122* (2013.01); *F28G 9/00* (2013.01); *F28G 15/00* (2013.01); *F24D 2220/0235* (2013.01); *Y10T 137/86638* (2015.04); *Y10T 137/86871* (2015.04)

(58) Field of Classification Search
CPC .... F16K 11/0655; F24H 9/122; F28G 15/00; F28G 9/00; F24D 2220/0235; Y10T 137/86638; Y10T 137/86823; Y10T 137/86863; Y10T 137/86871; Y10T 137/86533; Y10T 137/86541
USPC .......... 122/13.01, 13.3, 14.3, 14.31; 137/625.21, 625.41, 625.46, 625.47, 137/625.15, 625.16
See application file for complete search history.

(56) References Cited

U.S. PATENT DOCUMENTS

| | | | |
|---|---|---|---|
| 2,117,907 A | 5/1938 | Ogden | |
| 3,234,958 A | 2/1966 | Butters | |
| 3,627,203 A | 12/1971 | Martin | |
| 4,479,459 A | 10/1984 | Piper | |
| 5,009,572 A | 4/1991 | Imhoff et al. | |
| 5,538,033 A | 7/1996 | Condon | |
| 5,871,032 A * | 2/1999 | Ko | F16K 11/085 137/597 |
| 5,901,387 A * | 5/1999 | Fan | E03C 1/02 137/625.46 |
| 7,156,425 B2 | 1/2007 | Atkinson | |
| 7,621,295 B2 | 11/2009 | Reck | |
| 7,631,662 B2 | 12/2009 | Reck | |
| 7,644,730 B2 | 1/2010 | Reck | |
| 7,857,002 B2 | 12/2010 | Reck | |
| 2008/0216909 A1* | 9/2008 | Kim | F16K 11/0743 137/896 |
| 2009/0108223 A1* | 4/2009 | Deutsch | F16K 11/0743 251/284 |

* cited by examiner

*Primary Examiner* — Michael R Reid
(74) *Attorney, Agent, or Firm* — Jacobson Holman, PLLC.

(57) ABSTRACT

Disclosed is a valve device capable of washing an internal pipe in a hot water boiler wherein an operating part is not brought into contact with a body made of a metal material, and even though the valve device is not used for a long period of time, the operating part does not adhere to the body, and wherein the valve device is simple in configuration so that it can be easily mounted on a restricted installation area.

2 Claims, 10 Drawing Sheets

VALVE DEVICE CAPABLE OF WASHING INTERNAL PIPE IN HOT WATER BOILER

FIELD OF THE INVENTION

The present invention relates to a valve device capable of washing an internal pipe in a hot water boiler, and more particularly, to a valve device capable of washing an internal pipe in a hot water boiler that is simply configured to have generally T-shaped bodies, thus being gently converted into a mode for washing the internal pipe in the hot water boiler.

BACKGROUND OF THE RELATED ART

Generally, a hot water boiler, which heats water by using gas or electricity, has an internal pipe having a cold water introduction portion connected to a water supply source at one side thereof and a hot water discharge portion connected to a building pipe at the other side thereof. The cold water supplied to the hot water boiler through the cold water introduction portion is heated by means a gas burner or electric heater, while being passed through the internal pipe in the hot water boiler.

One conventional device for washing an internal pipe in a hot water boiler has been disclosed in U.S. Pat. No. 7,621,255, but the conventional device is configured to rotate a ball valve body in the interior of a body by means of a lever, so that the ball valve body adheres to the body, thus making it hard to operate the lever normally.

Through many studies, accordingly, this inventor has proposed a new valve device that is simple in configuration so that it can be easily mounted on a restricted installation area and that is provided with an operating part which is not brought into contact with a body so that even though the valve device is not used for a long period of time, the operating part does not adhere to the body.

SUMMARY OF THE INVENTION

Accordingly, the present invention has been made in view of the above-mentioned problems occurring in the prior art, and it is an object of the present invention to provide a valve device capable of washing an internal pipe in a hot water boiler wherein an operating part is not brought into contact with a body made of a metal material, and even though the valve device is not used for a long period of time, the operating part does not adhere to the body, and wherein the valve device is simple in configuration so that it can be easily mounted on a restricted installation area.

To accomplish the above object, according to the present invention, there is provided a valve device capable of washing an internal pipe in a hot water boiler, the hot water boiler having the internal pipe having a cold water introduction part connected to a water supply source at one side thereof and a hot water discharge part connected to a building pipe at the other side thereof, the valve device including: a first body including: a first introduction pipe portion connected to the water supply source; a second introduction pipe portion formed at a position where the center line thereof corresponds with that of the first introduction pipe portion in such a manner as to be connected with the cold water introduction part; an introduction side connection pipe portion formed between the first introduction pipe portion and the second introduction pipe portion in such a manner as to be perpendicular to the first introduction pipe portion and the second introduction pipe portion; an introduction side valve assembly pipe portion having a passage communicating with the first introduction pipe portion; a partition wall adapted to block the first introduction pipe portion, the second introduction pipe portion, and the introduction side connection pipe portion; a first through hole formed on a portion of the partition wall perpendicular to the introduction side valve assembly pipe portion in such a manner as to allow the first introduction pipe portion to communicate with the second introduction pipe portion; a second through hole formed adjacent to the first through hole in such a manner as to allow the first introduction pipe portion to communicate with the introduction side connection pipe portion; and a fixing groove portion formed below the first through hole and the second through hole; a second body including: a first discharge pipe portion connected to the hot water discharge part; a second discharge pipe portion formed at a position where the center line thereof corresponds with that of the first discharge pipe portion in such a manner as to be connected with the building pipe; a discharge side connection pipe portion formed between the first discharge pipe portion and the second discharge pipe portion in such a manner as to be perpendicular to the first discharge pipe portion and the second discharge pipe portion; a discharge side valve assembly pipe portion having a passage communicating with the first discharge pipe portion; a partition wall adapted to block the first discharge pipe portion, the second discharge pipe portion, and the discharge side connection pipe portion; a third through hole formed on a portion of the partition wall perpendicular to the discharge side valve assembly pipe portion in such a manner as to allow the first discharge pipe portion to communicate with the second discharge pipe portion; a fourth through hole formed adjacent to the third through hole in such a manner as to allow the first discharge pipe portion to communicate with the discharge side connection pipe portion; and a fixing groove portion formed below the third through hole and the fourth through hole; and a valve assembly including: a seat having two first through holes corresponding to the first and second through holes or the third and fourth through holes, a protrusion portion formed downward therefrom in such a manner as to be fitted into the fixing groove portion, first and second coupling protrusion portions formed upward therefrom, and a slant projection portion formed on the outside of each first coupling protrusion portion; a fixing circular plate having second through holes formed to correspond with the first through holes and fitting groove portions into which the first, coupling protrusion portions are fitted; a rotary circular plate having a space portion formed to communicate with one of the two second through holes and coupling groove portions formed along the outer periphery thereof; a lever coupling member having foot portions protruded downward therefrom in such a manner as to be fitted into the coupling groove portions, locking portions formed on the circumferential surface thereof, and pin fitting grooves formed on the top portion thereof; a spindle having pin members protruded from both sides of the lower portion thereof in such a manner as to be fitted into the pin fitting grooves; and a valve housing having a central through hole formed at the center thereof so as to pass the spindle therethrough, connection passages formed on the outer peripheral surface thereof in such a manner as to be connected to the passages, protrusion portions formed on the inner peripheral surface located above the connection passages so as to restrict the positions of the locking portions, coupling groove portions formed on the lower portion thereof so as to it the second coupling protrusion portions thereinto, and elastic coupling portions protruded downward therefrom and having coupling space portions into which the slant projection portions are fitted, wherein in the state where the valve assembly is inserted into the valve assembly pipe portions, respectively, the valve assembly is coupled to each of the first body and the second body by means of a cap nut.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a valve device capable of washing an internal pipe in a hot water boiler according to the present invention will be in detail given with reference to the attached drawing.

Figure 1:
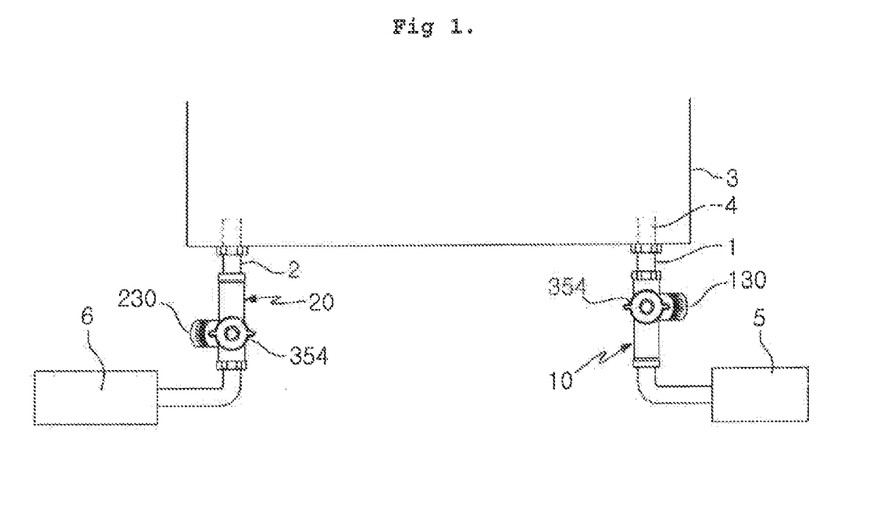
FIG. 1 is a front view showing an internal pipe in a hot water boiler adopted in the present invention.

As shown in FIG. 1, a valve device according to the present invention is capable of washing an internal pipe 4 in a hot water boiler 3, and the hot water boiler 3 has the internal pipe 4 having a cold water introduction part 1 connected to a water supply source at one side thereof and a hot water discharge part 2 connected to a building pipe 6 at the other side thereof.

The valve device of the present invention is mounted on the cold water introduction part 1 and on the hot water discharge part 2, respectively, so as to block the connection between the water supply source 5 and the building pipe 6 and at the same time allow the cold water introduction part 1 and the hot water discharge part 2 to be connected with the external equipment, thus permitting the internal pipe 4 of the hot water boiler 3 to form an independent line connected with the external equipment.

Figure 2:
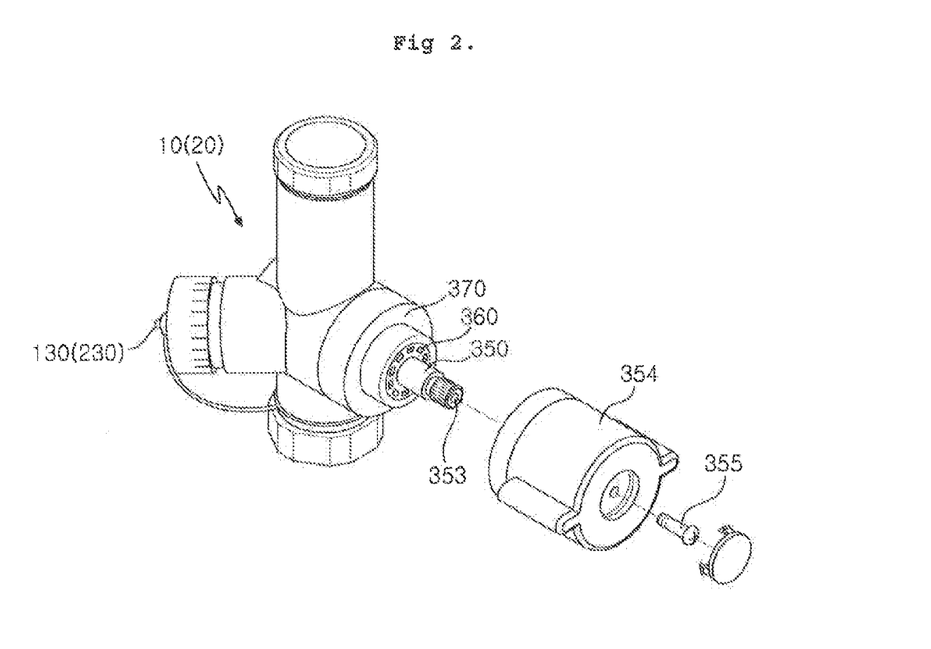
FIG. 2 is an exploded perspective view showing bodies and a valve assembly coupled to each body in a valve device capable of washing an internal pipe in a hot water boiler according to the present invention.

The valve device of the present invention includes: a first body 10 connected between the water supply source 5 and the cold water introduction part 1; a second body 20 connected between the hot water discharge part 2 and the building pipe 6; and a valve assembly 30 mounted on the first body 10 and the second body 20, respectively, so as to perform flow conversion.

Figure 3:
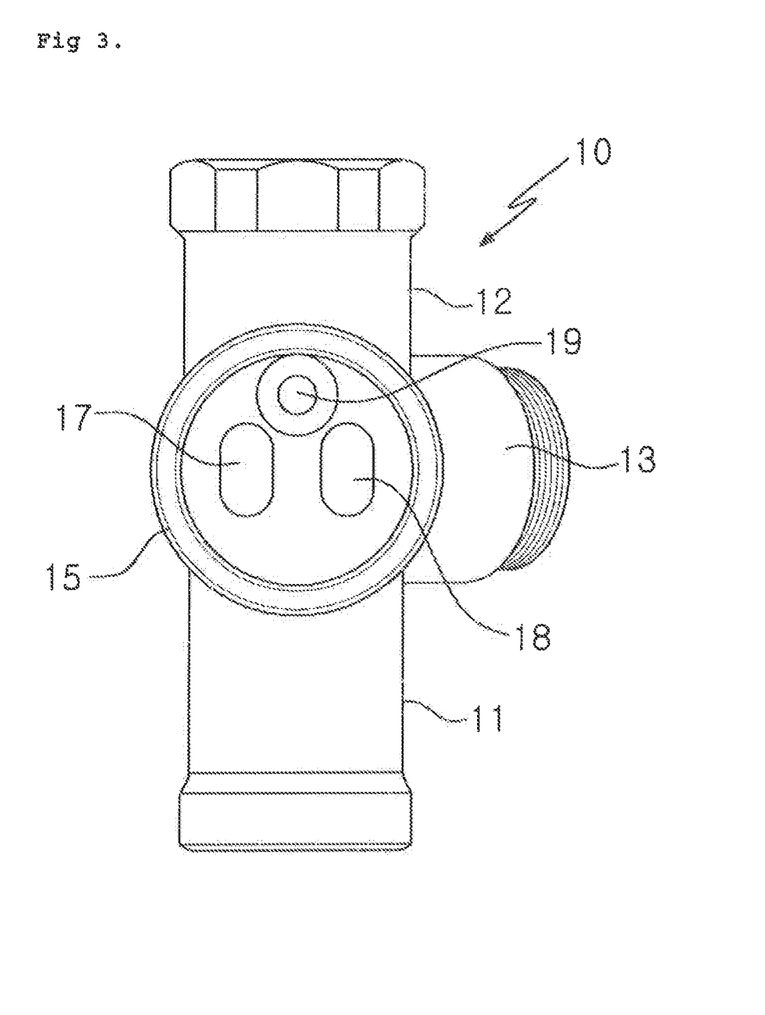
FIG. 3 is a side view showing the first body of the valve device according to the present invention.
Figure 4:
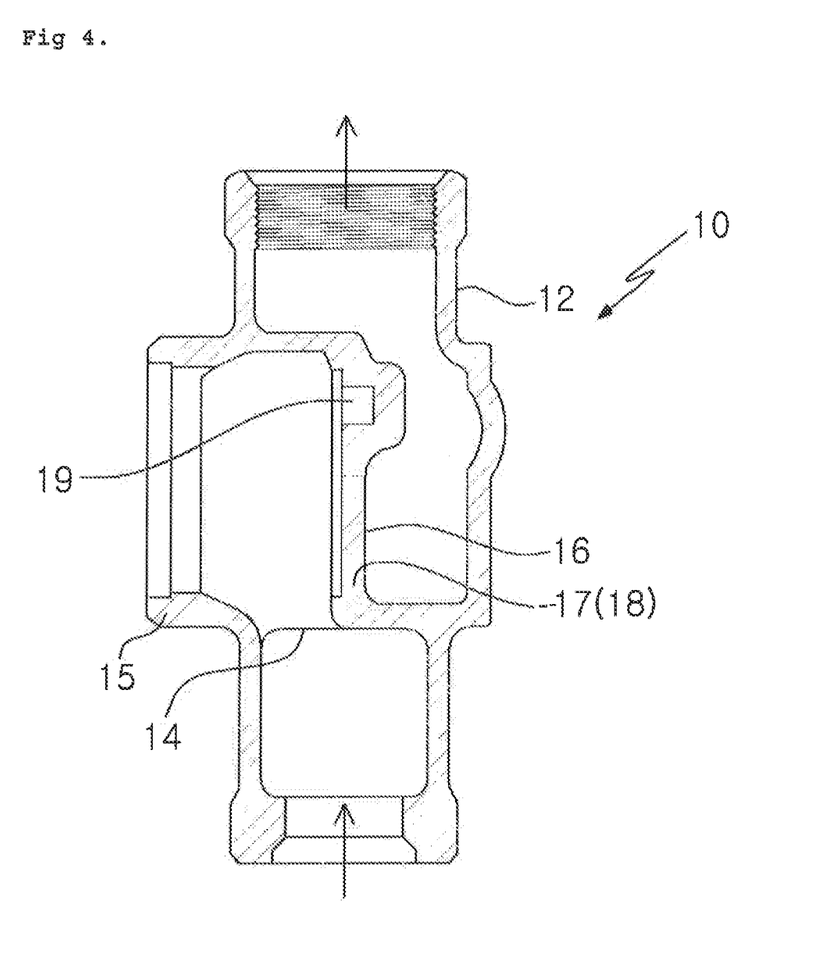
FIG. 4 is a sectional view taken along the line I-I of FIG. 3.

FIGS. 3 and 4 show the first body 10, and as shown, the first body 10 includes: a first introduction pipe portion 11 connected to the water supply source 5; a second introduction pipe portion 12 formed at a position where the center line thereof corresponds with that of the first introduction pipe portion 11 in such a manner as to be connected with the cold water introduction part 1; an introduction side connection pipe portion 13 formed between the first introduction pipe portion 11 and the second introduction pipe portion 12 in such a manner as to be perpendicular to the first introduction ripe portion 11 and the second introduction pipe portion 12; an introduction side valve assembly pipe portion 15 having a passage 14 communicating with the first introduction pipe portion 11; a partition wall 16 adapted to block the first introduction pipe portion 11, the second introduction pipe portion 12, and the introduction side connection pipe portion 13; a first through hole 17 formed on a portion of the partition wall 16 perpendicular to the introduction side valve assembly pipe portion 15 in such a manner as to allow the first introduction pipe portion 11 to communicate with the second introduction pipe portion 12; a second through hole 18 formed adjacent to the first through hole 17 in such a manner as to allow the first introduction pipe portion 11 to communicate with the introduction side connection pipe portion 13; and a fixing groove portion 19 formed above the first through hole 17 and the second through hole 18.

Figure 5:
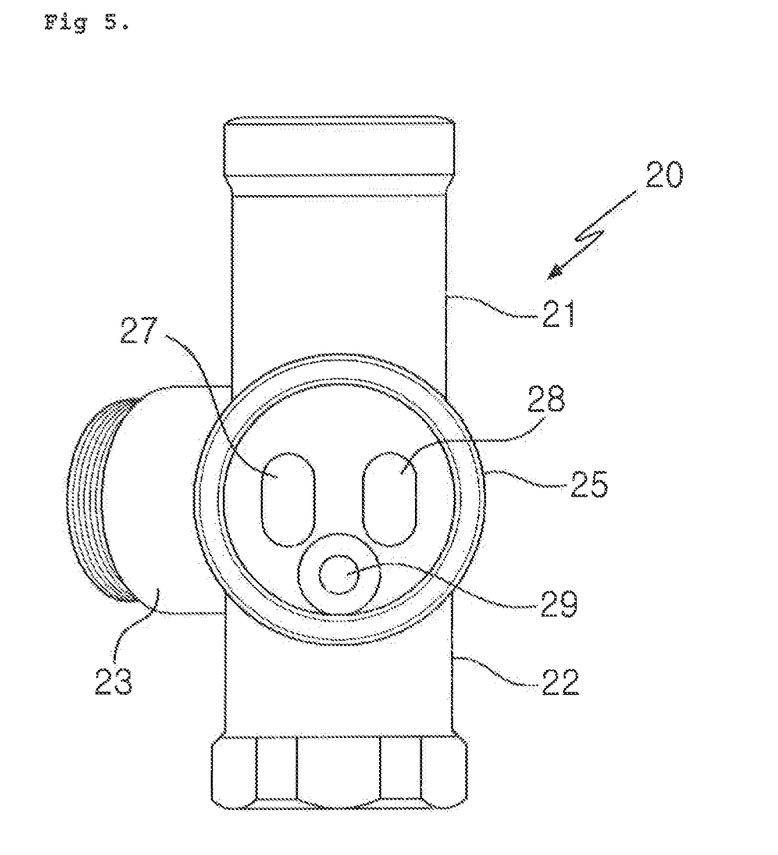
FIG. 5 is a side view showing the second body of the valve device according to the present invention.
Figure 6:
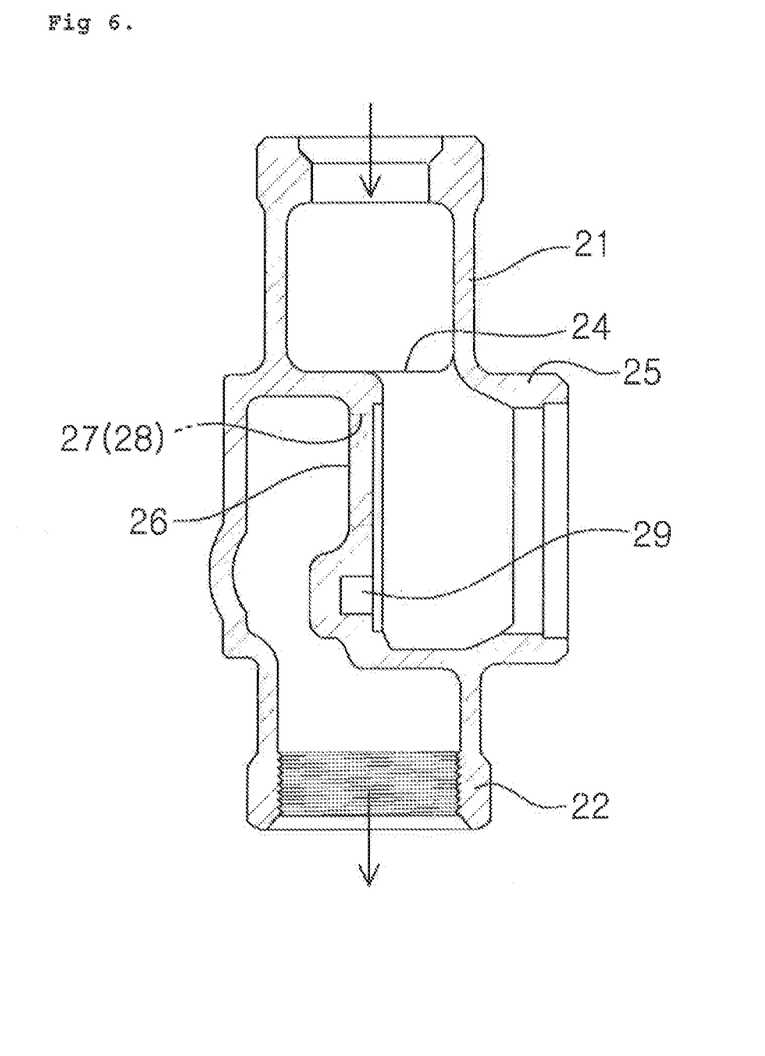
FIG. 6 is a sectional view taken along the line II-II of FIG. 5.

FIGS. 5 and 6 show the second body 20, and as shown, the second body 20 includes: a first discharge pipe portion 21 connected to the hot water discharge part 2; a second discharge pipe portion 12 formed at a position where the center line thereof corresponds with that of the first discharge pipe portion 21 in such a manner as to be connected with the building pipe 6; a discharge side connection pipe portion 23 formed between the first discharge pipe portion 21 and the second discharge pipe portion 22 in such a manner as to be perpendicular to the first discharge pipe portion 21 and the second discharge pipe portion 22; a discharge side valve assembly pipe portion 25 having a passage 24 communicating with the first discharge pipe portion 21; a partition wall 26 adapted to block the first discharge pipe portion 21, the second discharge pipe portion 22 and the discharge side connection pipe portion 23; a third through hole 27 formed on a portion of the partition wall 26 perpendicular to the discharge side valve assembly pipe portion 25 in such a manner as to allow the first discharge pipe portion 21 to communicate with the second discharge pipe portion 22; a fourth through hole 28 formed adjacent to the third through hole 27 in such a manner as to allow the first discharge pipe portion 21 to communicate with the discharge side connection pipe portion 23; and a fixing groove portion 29 formed below the third through hole 27 and the fourth through hole 28.

The introduction and discharge side connection pipe portions 13 and 23 of the first and second bodies 10 and 20 have stoppers 130 and 230 adapted to open them only if necessary.

The first and second bodies 10 and 20 are made through a single die, and therefore, they have the same structure as each other, except that the first body 10 is used to connect the water supply source 5 and the hot water boiler 3 and the second body 20 to connect the hot water boiler 3 and the building pipe 6.

Figure 7:
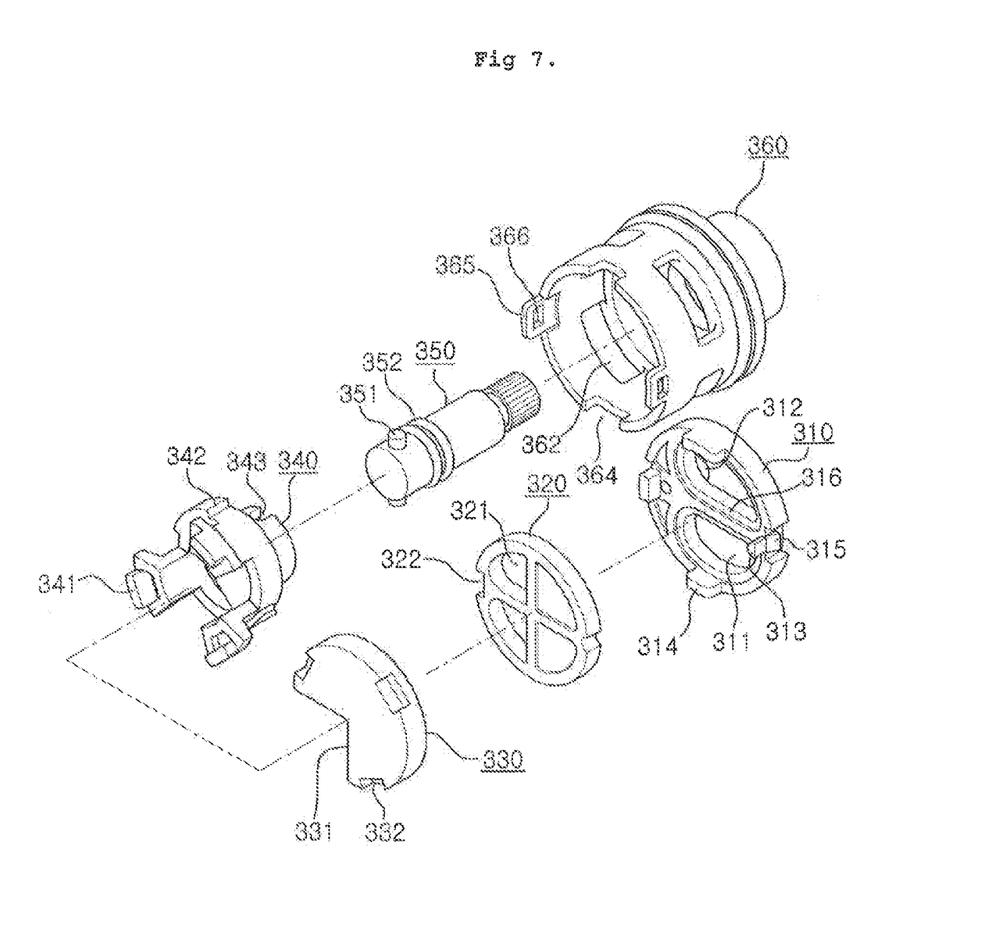
FIG. 7 is an exploded perspective view showing the valve assembly in the valve device according to the present invention.
Figure 8:
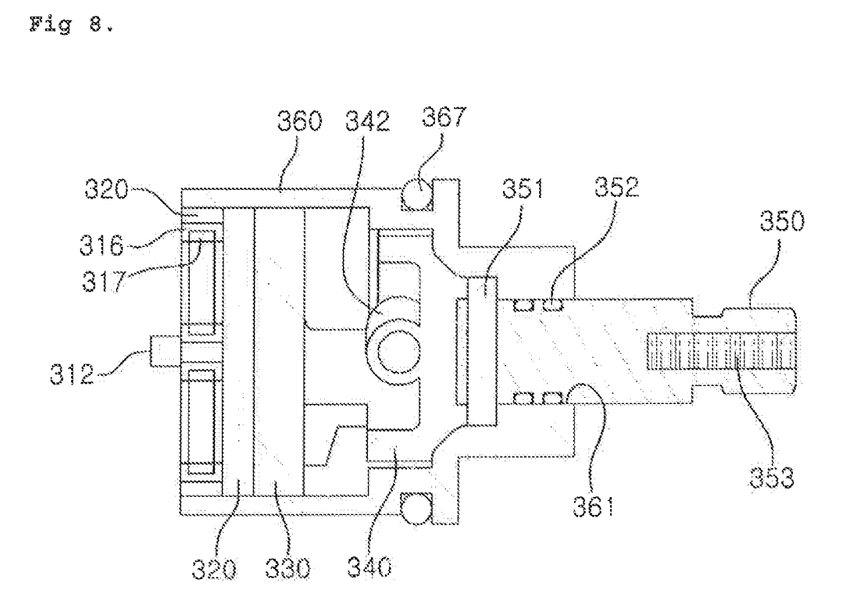
FIG. 8 is a sectional view showing the valve assembly in the valve device according to the present invention.

FIGS. 7 and 8 show the valve assembly 30 mounted on the valve assembly pine portions 15 and 25 of the first body 10 and the second body 20, respectively, and as shown, each valve assembly 30 includes a seat 310, a fixing circular plate 320, a rotary circular plate 330, a lever coupling member 340, a spindle 350, and a valve housing 360.

The seat 310 has two first through holes 311 corresponding to the first and second through holes 17 and 18 or the third and fourth through holes 27 and 28, a protrusion portion 312 formed downward therefrom in such a manner as to be fitted into the fixing groove portion 19 or 29, first and second coupling protrusion portions 313 and 314 formed upward therefrom, and a slant projection portion 315 formed on the outside of each first coupling protrusion portion 31. The formation of the protrusion portion 312 prevents the seat 310 from being coupled and rotated to the first body 10 or the second body 20. The formation of the first coupling protrusion portions 313 enables the seat 310 to be coupled to the fixing circular plate 320, and the formation of the second coup rig protrusion portions 314 and the slant projection portions 315 enables the seat 310 to be coupled to the valve housing 360.

Figure 9:
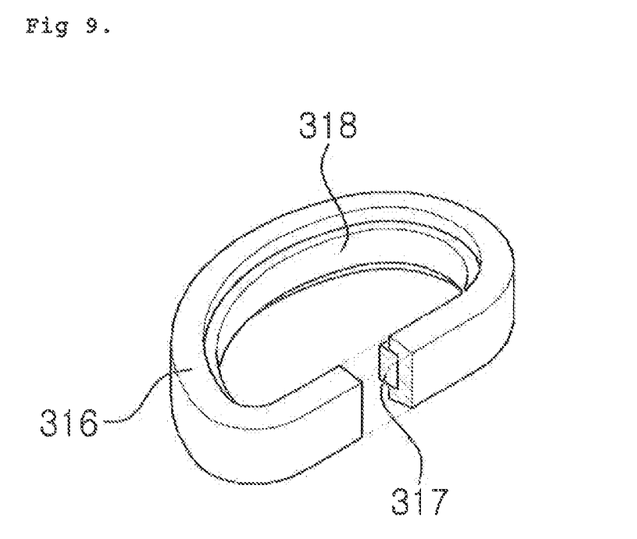
FIG. 9 is a partially cut perspective view showing a packing assembly provided on a seat in the valve device according to the present invention.

FIG. 9 shows a packing assembly disposed on the two first through holes 311, respectively, and as shown, each packing assembly includes: a silicone material packing 316 fitted into each first through hole 311; a mounting groove 317 formed along the inner peripheral surface of the packing 316; and a guide 318 fitted into the mounting groove 317. The guide 318 is coupled to as the packing 316 in such a manner as to be surrounded by the packing 316, and the underside surface of the packing 316 serves to maintain the airtight state between the first and second through holes 17 and 18 or the third and fourth through holes 27 and 28 and the valve assembly 30.

The fixing circular plate 320 has second through holes 321 formed to correspond with the first through holes 311 and fitting groove portions 322 into which the first coupling protrusion portions 313 are fitted. The fixing circular plate 320 is coupled to the packing 316 in such a manner as to be brought into contact with the top surface of the packing 316.

The fitting groove portions 322 into which the first coupling protrusion portions 313 are fitted have different widths from each other, so as to determine the relative position of the seat 310 with respect to the fixing circular plate 320, thus desirably preventing the occurrence of erroneous assembling therebetween.

The rotary circular plate 330 has a space portion 331 formed to communicate with one of the two second through holes 311 and coupling groove portions 332 formed along the outer periphery thereof. The coupling groove portions 332 serve to allow the rotary circular plate 330 to be coupled to the lever coupling member 340.

A lubricant is provided between the fixing circular plate 320 and the rotary circular plate 330 surface-contacted with each other, thus making the rotary circular plate 330 gently rotated.

The lever coupling member 340 has foot portions 341 protruded downward therefrom in such a manner as to be fitted into the coupling groove portions 332, locking portions 342 formed on the circumferential surface thereof, and pin fitting grooves 343 formed on the to portion thereof. The formation of the locking portions 342 restricts the rotatable range of the lever coupling member 340 in the interior of the valve housing 360.

The spindle 350 has pin members 351 protruded from both sides of the lower portion thereof in such a manner as to be fitted into the pin fitting grooves 343, and the pin members 351 serve to allow the lever coupling member 340 to be rotated by means of the spindle 350. Further, a ring packing 352 is disposed above the pin members 351 along the outer peripheral surface of the spindle 350, so as to maintain the airtight state between the valve housing 360 and the spindle 350. Furthermore, a screw hole 353 is formed above the pin members 351 on the spindle 350 so as to be fastened to a lever 354 by means of a screw 355.

The valve housing 360 includes: a central through hole 361 formed at the center thereof, through which the spindle 350 is passed; connection passages 362 formed on the outer peripheral surface thereof in such a manner as to be connected to the passages 14 and 24; protrusion portions 363 formed on the inner peripheral surface located above the connection passages 362 so as to restrict the positions of the locking portions 342; coupling groove portions 364 formed on the lower portion thereof so as to fit the second coupling protrusion portions 314 thereinto; and elastic coupling portions 365 protruded downward therefrom and having coupling space portions 366 into which the slant projection portions 315 are fitted. Further, the valve housing 360 has a ring packing 367 disposed on the outer peripheral surface of the upper portion thereof so as to maintain the airtight state between the first body 10 or the second body 20 and the valve housing 360.

Widths of the three foot portions 341 fitted into the coupling groove portions 332 are different from each other, so as to determine the relative positions of the lever coupling member 340 with respect to the rotary circular plate 330, thus desirably preventing the occurrence of erroneous assembling therebetween.

Figure 10:
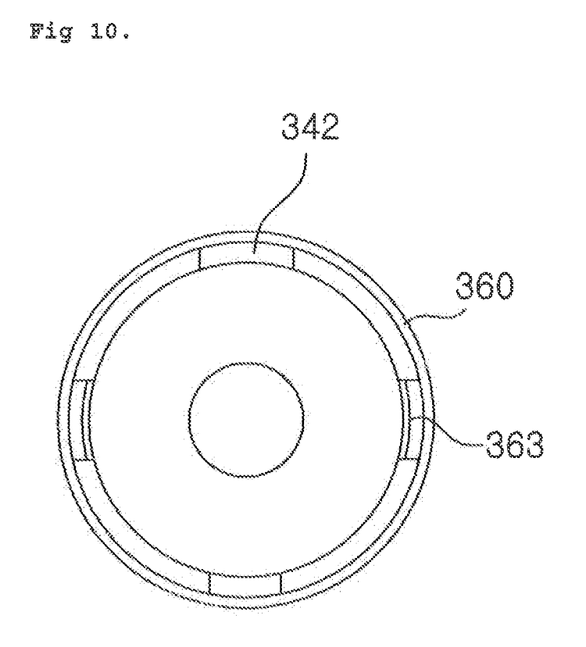
FIG. 10 is a sectional view showing protruding portions of a valve housing in the valve device according to the present invention.
Figure 11A:
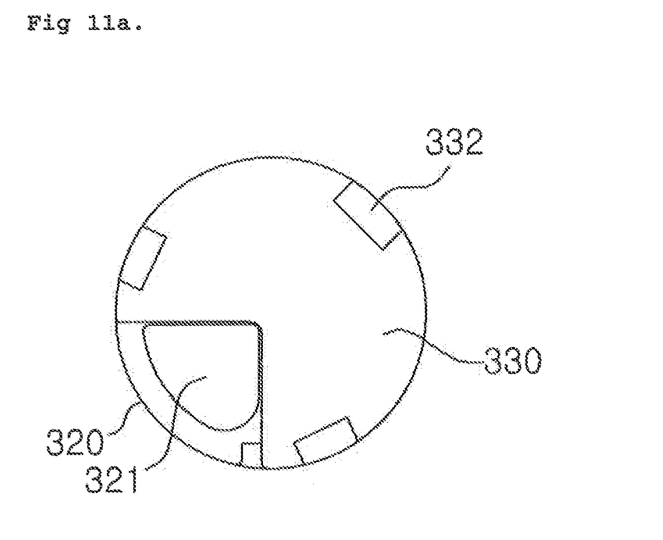
FIGS. 11a and 11b are sectional views showing the operating states of the valve housing in the valve device according to the present invention.
Figure 11B:
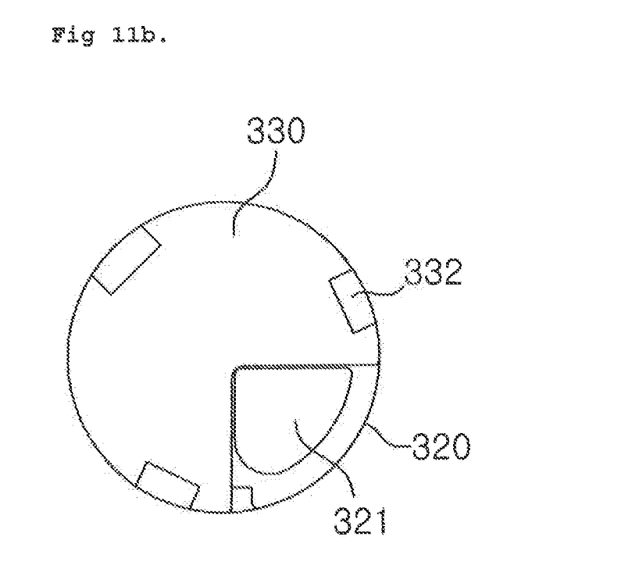

So as to make the valve assembly 30, first, the spindle 350 is inserted into the central through hole 361 of the valve housing 360, and after that, the pin members 351 protruded downward from the lower portion of the spindle 350 are fitted into the pin fitting grooves 343, thus coupling the spindle 350 to the lever coupling member 340. At this time as shown in FIG. 10, the locking portions 342 are located between the protrusion portions 363 to restrict the rotatable range of the spindle 350.

Next, the first coupling protrusion portions 313 of the seat 310 are fitted into the fitting groove portions 322, and in the state where the rotary circular plate 330 is placed on the fixing circular plate 320 onto which the viscous lubricant is applied, the coupling groove portions 332 are fitted into the foot portions 341. At the same time, the slant projection portions 315 are fitted into the coupling space portions 366, thus coupling the seat 310 to the valve housing 360. As a result, the assembling work for the valve housing 30 is finished.

In the state where the assembled valve assembly 30 is inserted into the valve assembly pipe portions 15 and 25, respectively, the valve assembly 30 is coupled to each of the first and second bodies 10 and 20 by means of a cap nut 370, and the lever 354 is coupled to the valve assembly 30 by means of the screw 355, thus finishing the coupling of the valve assembly 30 to each of the first and second bodies 10 and 20.

Figure 12:
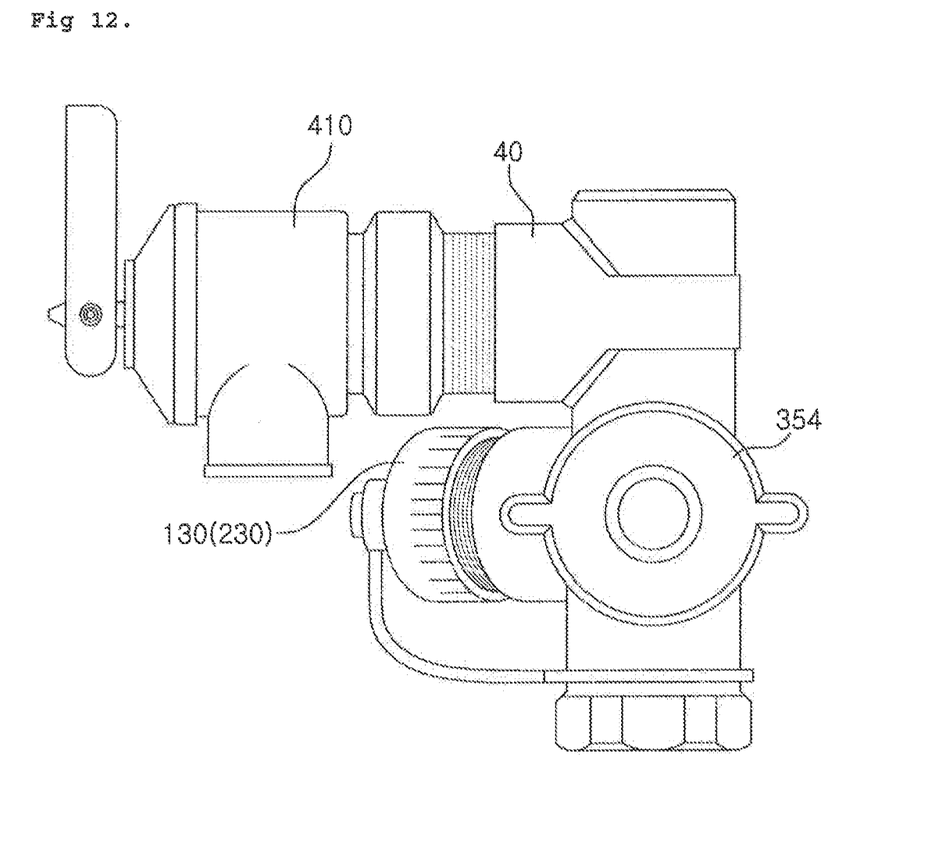
FIG. 12 is a front view showing a safety valve mounted on the valve device according to the present invention.

According to the present invention, the fluid of the first body 10 is sequentially passed through the first introduction pipe portion 11, the passage 14, and the connection passages 362, and as shown in FIG. 12, it flows through one selected from the two through holes 321 connected to the connection passages 362 in accordance with the position of the space portion 331.

That is, when the space portion 331 is located at the position connected to the first hole 17, the first introduction pine portion 11 and the second introduction pipe portion 12 are connected to each other, thus causing a normal state wherein the cold water of the water supply source 5 is introduced into the internal pipe 4, of the hot water boiler 3. Contrarily, when the space portion 331 is located at the position connected to the second through hole 18, the first introduction pipe portion 11 is connected to the introduction side connection pipe portion 13 and at the same time blocks the connection with the water supply source 5, thus causing the state wherein wash water is supplied from the internal pipe 4 through the introduction side connection pipe portion 13.

According to the present invention, the fluid of the second body 20 is sequentially passed through the first discharge pipe portion 21, the passage 24, and the connection passages 362, and it flows through one selected from the two through holes 321 connected to the space portion 331 to any one of the first discharge pipe portion 22 and the discharge side connection pipe portion 23.

The rotary circular plate 330 on which the space portion 331 is formed is connected to the lever 354 through the coupling with the lever coupling member 340 and the spindle 350, and as the lever 354 is operated, the space portion 331 can communicate with one of the two through holes 321.

According to the present invention, if the levers 354 are rotated to connect the first introduction pipe portion 11 of the first body 10 to the second introduction pipe portion 12 thereof and to connect the first discharge pipe portion 21 of the second body 20 to the second discharge pipe portion 22 thereof, the normal state is made wherein the fluid is supplied from the water supply source 5 to the first body 10, the internal pipe 4, the second body 20 and the building pipe 6.

Further, if the levers 354 are rotated to connect the first introduction pipe portion 11 of the first body 10 to the introduction side connection pipe portion 13 thereof and to connect the first discharge pipe portion 21 of the second body 20 to the discharge side connection pipe portion 23 thereof, the wash water is supplied to the first body 10, the internal pipe 4, and the second body 20, thus washing the internal pipe 4. At this time, the water supply source 5 and the building pipe 6 are blocked from the hot water boiler 3 through the valve device according to the present invention.

The passage of the wash water may be of course formed from the second body 20 to the first body 10, reversely.

FIG. 12 shows another embodiment of the present invention wherein a safety valve 410 is mounted on the second body 20. As shown, a pipe portion 40 is mounted on the second body 20 in such a manner as to be connected with the first discharge pipe portion 21, and the safety valve 410 is mounted on the pipe portion 40, so that if an excessive pressure is applied to the valve device according to the present invention, the safety valve 410 is operated to prevent the occurrence of safety accidents.

As described above, the valve device of the present invention is configured wherein the rotary circular plate rotating by the lever converts the passage or the fluid on top of the fixing circular plate disposed inside the valve housing, and therefore, even though the valve device is not used for a long period of time, the rotary circular plate as an operating part does not adhere to the first body and the second body, respectively. Further, the valve device of the present invention is simple in configuration so that it can be easily mounted on a restricted installation area.

While the present invention has been described with reference to the particular illustrative embodiments, it is not to be restricted by the embodiments but only by the appended claims, it is to be appreciated that those skilled in the art can change or modify the embodiments without departing from the scope and spirit of the present invention.

What is claimed is:

1. A valve device capable of washing an internal pipe in a hot water boiler, the hot water boiler having the internal pipe having a cold water introduction part connected to a water supply source at one side thereof and a hot water discharge part connected to a building pipe at the other side thereof, the valve device comprising:

a first body comprising: a first introduction pipe portion connected to the water supply source; a second introduction pipe portion formed at a position where a center line thereof corresponds with that of the first introduction pipe portion in such a manner as to be connected with the cold water introduction part; an introduction side connection pipe portion formed between the first introduction pipe portion and the second introduction pipe portion in such a manner as to be perpendicular to the first introduction pipe portion and the second introduction pipe portion; an introduction side valve assembly pipe portion having a passage communicating with the first introduction pipe portion; a partition wall adapted to block the first introduction pipe portion, the second introduction pipe portion, and the introduction side connection pipe portion; a first through hole formed on a portion of the partition wall perpendicular to the introduction side valve assembly pipe portion in such a manner as to allow the first introduction pipe portion to communicate with the second introduction pipe portion; a second through hole formed adjacent to the first through hole in such a manner as to allow the first introduction pipe portion to communicate with the introduction side connection pipe portion; and a fixing groove portion formed below the first through hole and the second through hole;

a second body comprising; first discharge pipe portion connected to the hot water discharge part; a second discharge pipe portion formed at a position where a center line thereof corresponds with that of the first discharge pipe portion in such a manner as to be connected with the building pipe; a discharge side connection pipe portion formed between the first discharge pipe portion and the second discharge pipe portion in such a manner as to be perpendicular to the first discharge pipe portion and the second, discharge pipe portion; a discharge side valve assembly pipe portion having a passage communicating with the first discharge pipe portion; a partition wall adapted to block the first discharge pipe portion, the second discharge pipe portion, and the discharge side connection pipe portion; a third through hole formed on a portion of the partition wall perpendicular to the discharge side valve assembly pipe portion in such a manner as to allow the first discharge pipe portion to communicate with the second discharge pipe portion; a fourth through hole formed adjacent to the third through hole in such a manner as to allow the first discharge pipe portion to communicate with the discharge side connection pipe portion; and a fixing groove portion formed below the third through hole and the fourth through hole; and a valve assembly comprising: a seat having two fifth through holes corresponding to the first and second through holes or the third and fourth through holes and, a protrusion portion formed downward therefrom in such a manner as to be fitted into the fixing groove portion or, first and second coupling protrusion portions and formed upward therefrom, and a slant projection portion formed on an outside of each first coupling protrusion portion; a fixing circular plate having sixth through holes formed to correspond with the fifth through holes and fitting groove portions into which the first coupling protrusion portions are fitted; a rotary circular plate having a space portion formed to communicate with one of the two second through holes and coupling groove portions formed along an outer periphery thereof; a lever coupling member having foot portions protruded downward therefrom in such a manner as to be fitted into the coupling groove portions, locking portions formed on a circumferential surface thereof, and pin fitting grooves formed on a top portion thereof; a spindle having pin members protruded from both sides of a lower portion thereof in such a manner as to be fitted into the pin fitting grooves; and a valve housing having a central through hole formed at a center thereof so as to pass the spindle therethrough, connection passages formed on an outer peripheral surface thereof in such a manner as to be connected to the connection passages and, protrusion portions formed on an inner peripheral surface located above the connection passages so as to restrict the positions of the locking portions, coupling groove portions formed on a lower portion thereof so as to fit the second coupling protrusion portions thereinto, and elastic coupling portions protruded downward therefrom and having coupling space portions into which the slant projection portions are fitted, wherein in the state where the valve assembly is inserted into the introduction side valve assembly pipe portion of the first body or the discharge side valve assembly pipe portion of the second body, the valve assembly is coupled to the first body or the second body by means of a cap nut.

2. The valve device according to claim 1, wherein the second body has a pipe portion mounted thereon in such a manner as to be connected with the first discharge pipe portion, the pipe portion having a safety valve mounted thereon.

* * * * *